(12) United States Patent
Irino et al.

(10) Patent No.: US 11,694,135 B2
(45) Date of Patent: Jul. 4, 2023

(54) INFORMATION PROCESSING APPARATUS, INFORMATION PROCESSING METHOD, AND INFORMATION PROCESSING PROGRAM

(71) Applicant: DMG MORI CO., LTD., Nara (JP)

(72) Inventors: Naruhiro Irino, Nara (JP); Yasuhiro Imabeppu, Nara (JP); Yosuke Higuchi, Nara (JP)

(73) Assignee: DMG Mori Co., Ltd., Nara (JP)

( * ) Notice: Subject to any disclaimer, the term of this patent is extended or adjusted under 35 U.S.C. 154(b) by 0 days.

(21) Appl. No.: 17/044,627

(22) PCT Filed: Mar. 25, 2019

(86) PCT No.: PCT/JP2019/012605
§ 371 (c)(1),
(2) Date: Oct. 1, 2020

(87) PCT Pub. No.: WO2019/194015
PCT Pub. Date: Oct. 10, 2019

(65) Prior Publication Data
US 2021/0125126 A1 Apr. 29, 2021

(30) Foreign Application Priority Data

Apr. 3, 2018 (JP) .................. 2018-071528

(51) Int. Cl.
*G06Q 10/0631* (2023.01)
*G06F 16/903* (2019.01)
(Continued)

(52) U.S. Cl.
CPC . *G06Q 10/06313* (2013.01); *G06F 16/90335* (2019.01); *G06Q 10/043* (2013.01);
(Continued)

(58) Field of Classification Search
None
See application file for complete search history.

(56) References Cited

U.S. PATENT DOCUMENTS

| 4,827,423 | A | * | 5/1989 | Beasley | G01N 29/2493 |
| | | | | | 700/100 |
| 5,216,593 | A | * | 6/1993 | Dietrich | G06Q 10/0875 |
| | | | | | 700/36 |

(Continued)

FOREIGN PATENT DOCUMENTS

| CA | 2953667 A1 * 12/2015 | ....... G05B 19/41865 |
| EP | 1296210 A1 3/2003 | |

(Continued)

OTHER PUBLICATIONS

JP 2013-084035, Yoichi et al., Production Planning Device and Production Planning Method, Hitachi Ltd., May 9, 2013, pp. 1-53 (machine translation) (Year: 2013).*

(Continued)

*Primary Examiner* — Darlene Garcia-Guerra
(74) *Attorney, Agent, or Firm* — Sheppard Mullin Richter & Hampton LLP

(57) ABSTRACT

There is provided an information processing apparatus for efficiently processing various products. The information processing apparatus includes a determiner that receives signals from sensors respectively provided in a plurality of machine tools, determines operation statuses of the plurality of machine tools, and derives a plurality of usable machine tools, a receiver that receives product specifying data for specifying a product to be manufactured, a decider that decides, based on the product specifying data, a necessary machine tool required to process the product, and a presenter that searches for the necessary machine tool from the (Continued)

plurality of usable machine tools, and presents information concerning a use machine tool as a search result.

20 Claims, 8 Drawing Sheets

(51) Int. Cl.

| | | |
|---|---|---|
| *G06Q 10/04* | (2023.01) | |
| *G06Q 10/067* | (2023.01) | |
| *G06Q 10/10* | (2023.01) | |
| *G06Q 50/04* | (2012.01) | |
| *G07C 3/02* | (2006.01) | |

(52) U.S. Cl.
CPC ..... *G06Q 10/067* (2013.01); *G06Q 10/06312* (2013.01); *G06Q 10/06315* (2013.01); *G06Q 10/103* (2013.01); *G06Q 50/04* (2013.01); *G07C 3/02* (2013.01)

(56) References Cited

U.S. PATENT DOCUMENTS

| | | | | |
|---|---|---|---|---|
| 5,377,116 | A * | 12/1994 | Wayne | G05B 19/4097 706/904 |
| 5,971,589 | A * | 10/1999 | Hazama | G05B 19/4181 700/145 |
| 5,987,181 | A * | 11/1999 | Makiyama | H04N 21/2662 358/426.12 |
| 7,925,365 | B2 * | 4/2011 | Chua | G06Q 10/06 700/101 |
| 10,705,504 | B2 * | 7/2020 | Kurosawa | G05B 19/4183 |
| 2002/0059320 | A1 * | 5/2002 | Tamaru | E01C 19/00 |
| 2003/0155415 | A1 * | 8/2003 | Markham | G06Q 50/00 235/376 |
| 2004/0009585 | A1 * | 1/2004 | Venancio | B82Y 30/00 435/287.2 |
| 2006/0031840 | A1 * | 2/2006 | Yigit | G06F 9/5088 718/102 |
| 2008/0077479 | A1 * | 3/2008 | Carter | G06Q 10/04 705/7.31 |
| 2009/0204234 | A1 * | 8/2009 | Sustaeta | G05B 13/0285 700/29 |
| 2011/0257778 | A1 * | 10/2011 | Takahashi | G05B 19/4069 700/104 |
| 2012/0303674 | A1 * | 11/2012 | Boensch | G06F 16/252 707/802 |
| 2013/0046405 | A1 * | 2/2013 | Shamoto | G05B 19/404 700/190 |
| 2014/0330605 | A1 * | 11/2014 | Connolly | G06Q 10/063116 705/7.16 |
| 2016/0188770 | A1 * | 6/2016 | Montana | G05B 19/4069 703/6 |
| 2017/0032302 | A1 * | 2/2017 | Lete | G06Q 50/08 |
| 2017/0109673 | A1 * | 4/2017 | Bell | G06Q 10/06313 |
| 2017/0297323 | A1 * | 10/2017 | Yamazaki | B33Y 10/00 |
| 2018/0096175 | A1 * | 4/2018 | Schmeling | G06F 1/3206 |

FOREIGN PATENT DOCUMENTS

| | | | |
|---|---|---|---|
| EP | 3163392 A1 | 5/2017 | |
| JP | 11151841 A | 6/1999 | |
| JP | 2033030489 A | 1/2003 | |
| JP | 2004070424 A | 3/2004 | |
| JP | 2004348482 A * | 12/2004 | ............ G06F 17/60 |
| JP | 2004348482 A | 12/2004 | |
| JP | 2065085229 A | 3/2005 | |
| JP | 2005309713 A | 11/2005 | |
| JP | 2013084035 A * | 5/2013 | ....... G05B 19/41865 |
| JP | 2013584035 A | 5/2013 | |
| JP | 2016009361 A | 1/2016 | |
| JP | 2017021857 A | 1/2017 | |
| JP | 2017201528 A | 11/2017 | |
| WO | 0203155 A1 | 1/2002 | |
| WO | WO-2013002097 A1 * | 1/2013 | ......... G05B 19/4069 |

OTHER PUBLICATIONS

JP 2004-348482, Fujisaka Yoichi, Rental information exchange system for machine tool owned by proprietor, Nitto Polygon Co. Ltd., Dec. 9, 2004, pp. 1-27 (machine translation) (Year: 2004).*
Lee, B. Y., and Y. S. Tarng. "Cutting-parameter selection for maximizing production rate or minimizing production cost in multistage turning operations." Journal of Materials Processing Technology 105.1-2 (2000): 61-66 (Year: 2000).*
Mourtzis, Dimitris, et al. "Cloud-based adaptive process planning considering availability and capabilities of machine tools." Journal of Manufacturing Systems 39 (2016): 1-8 (Year: 2016).*
Adegbuyi, Patrick Adebisi Olusegun, and Emmanuel Sesofia Asapo. "The effect of production planning and budgeting on organizational productivity." Leonardo Electronic Journal of Practices and Technologies 16.20 (2010) (Year: 2010).*
Brecher, Christian, Martin Esser, and Stephan Witt. "Interaction of manufacturing process and machine tool." CIRP annals 58.2 (2009): 588-607. (Year: 2009).*
Åström, Peter. Simulation methodologies within virtual manufacturing applied on mechanical cutting. Diss. Luleå tekniska universitet, 2001 (Year: 2011).*
WO 2013002097 A1, Miyata, Akira, Work Simulation Device and Method, Jun. 20, 2012, pp. 1-9 (machine translation) (Year: 2012).*
Ozcelik, Babur, and Mahmut Bayramoglu. "The statistical modeling of surface roughness in high-speed flat end milling." International Journal of Machine Tools and Manufacture 46.12-13 (2006): 1395-1402 (Year: 2006).*
International Search Report (ISR) with an English translation dated Jun. 18, 2019 for Application No. PCT/JP2019/012605.
Japanese Office Action (Decision of Refusal) with an English translation dated May 19, 2020 for Application No. JP2018-071528.
Decision to Grant a Patent with an English translation dated Oct. 6, 2020 for Application No. JP 2018-071528.
Espacenet English abstract of JP 2005085229 A.
Espacenet English abstract of JP 11151641 A.
Decision to Grant a Patent dated Oct. 6, 2020 for Application No. JP 2018-071528.
Extended European Search Report dated Oct. 15, 2021 for Application No. EP 19781485.8.
Zheng et al: "A web-based machining parameter selection system for life cycle cost reduction and product quality enhancement", Computers in Industry, Elsevier, Amsterdam, NL, vol. 59. No. 2-3, Jan. 11, 2008 (Jan. 11, 2008), pp. 254-261, XP022417775.
Azab A et al: "Sequential process planning: A hybrid optimal macro-level approach", Journal of Manufacturing Systems, Society of Manufacturing Engineers, Dearborn, MI, US, vol. 26, No. 3-4, Jul. 1, 2007 (Jul. 1, 2007), pp. 147-160, XP025474557.
Teti R et al: "Intelligent Computing Methods far Manufacturing Systems", CIRP Annals, Elsevier BV, NL, CH, FR, vol. 46, No. 2, Jan. 1, 1997 (Jan. 1, 1997), pp. 629-652. XP027078799.

* cited by examiner

ORDER-DEDICATED PAGE

UPLOAD PROCESSING DATA OF DESIRED PRODUCT,
AND INPUT NUMBER OF PRODUCTS,
DELIVERY DATE, AND BUDGET

SELECT FILE

NUMBER OF PRODUCTS

DESIRED DELIVERY DATE

BUDGET

FIG. 5

INFORMATION PROCESSING APPARATUS, INFORMATION PROCESSING METHOD, AND INFORMATION PROCESSING PROGRAM

RELATED APPLICATION

This application is an application under 35 U.S.C. 371 of International Application No. PCT/JP2019/012605 filed on Mar. 25, 2019, the entire contents of which are incorporated herein by reference.

This application is based upon and claims the benefit of priority from Japanese patent application No. 2018-071528, filed on Apr. 3, 2018, the disclosure of which is incorporated herein in its entirety by reference.

TECHNICAL FIELD

The present invention relates to an information processing apparatus, an information processing method, and an information processing program.

BACKGROUND ART

In the above technical field, patent literature 1 discloses a system that receives an order of a product via a network and manufactures the product.

CITATION LIST

Patent Literature

Patent literature 1: Japanese Patent Laid-Open No. 2017-201528

SUMMARY OF THE INVENTION

Technical Problem

In the technique described in the above literature, however, there is provided an ordering/manufacturing system limited to processing of a mold, which aims at improving efficiency of supply while target merchandise is largely limited, and thus the degree of freedom of products to be manufactured is extremely small.

The present invention provides a technique of solving the above-described problem.

Solution to Problem

One example aspect of the present invention provides an information processing apparatus comprising:

a determiner that receives signals from sensors respectively provided in a plurality of machine tools, determines operation statuses of the plurality of machine tools, and derives a plurality of usable machine tools;

a receiver that receives product specifying data for specifying a product to be manufactured;

a decider that decides, based on the product specifying data, a necessary machine tool required to process the product; and a presenter that searches for the necessary machine tool from the plurality of usable machine tools, and presents information concerning a use machine tool as a search result.

Another example aspect of the present invention provides a method comprising:

receiving signals from sensors respectively provided in a plurality of machine tools, determining operation statuses of the plurality of machine tools, and deriving a plurality of usable machine tools;

receiving product specifying data for specifying a product to be manufactured;

deciding, based on the product specifying data, a necessary machine tool required to process the product; and searching for the necessary machine tool from the plurality of usable machine tools, and presenting information concerning a use machine tool as a search result.

Still other example aspect of the present invention provides a program for causing a computer to execute a method, comprising:

receiving signals from sensors respectively provided in a plurality of machine tools, determining operation statuses of the plurality of machine tools, and deriving a plurality of usable machine tools;

receiving product specifying data for specifying a product to be manufactured;

deciding, based on the product specifying data, a necessary machine tool required to process the product; and searching for the necessary machine tool from the plurality of usable machine tools, and presenting information concerning a use machine tool as a search result.

Advantageous Effects of Invention

According to the present invention, it is possible to readily order processing of various products while grasping the states of a plurality of machine tools.

BRIEF DESCRIPTION OF DRAWINGS

FIG. 5 is a view showing an example of a screen provided by the information processing apparatus according to the second example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An information processing apparatus 100 according to the first example embodiment of the present invention will be described with reference to FIG. 1. The information processing apparatus 100 is an apparatus that makes a proposal to complete a work in a shape input by a user.

Figure 1:
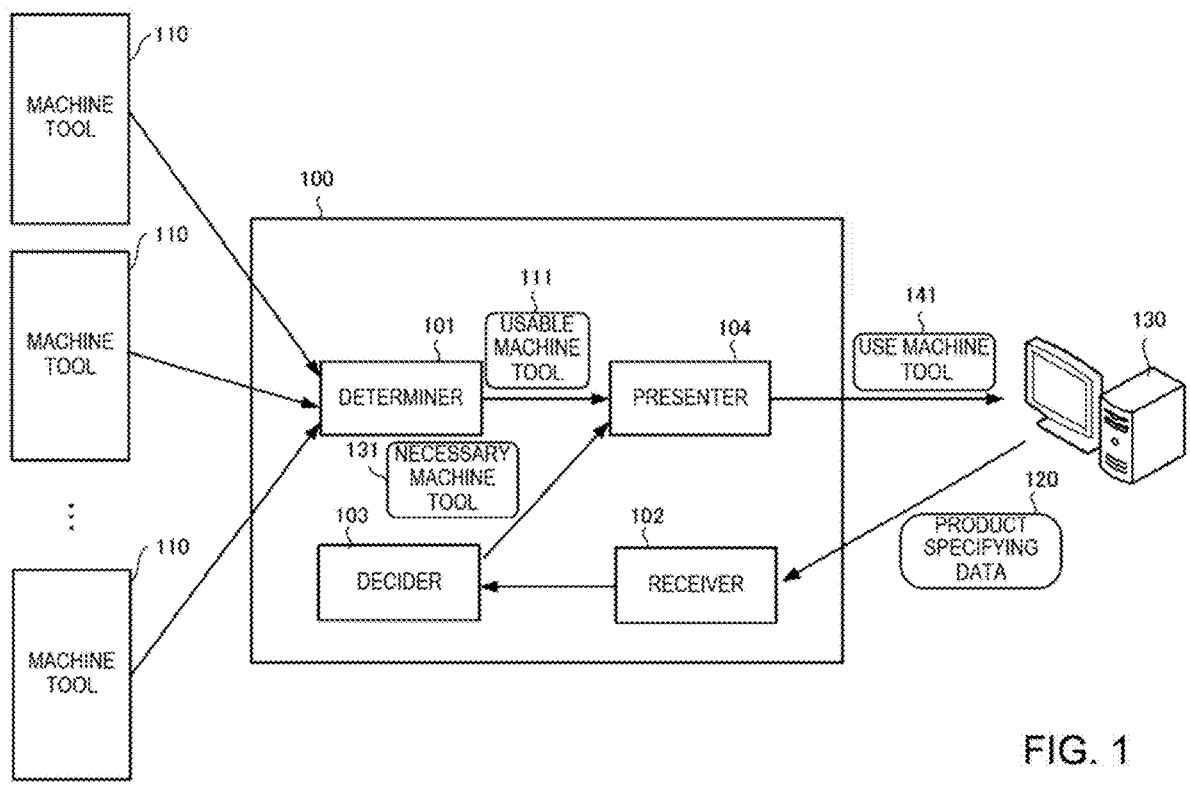
FIG. 1 is a block diagram showing the arrangement of an information processing apparatus according to the first example embodiment of the present invention.

As shown in FIG. 1, the information processing apparatus 100 includes a determiner 101, a receiver 102, a decider 103, and a presenter 104.

The determiner 101 receives signals from sensors respectively provided in a plurality of machine tools 110, and determines the operation statuses of the plurality of machine tools 110, thereby deriving usable machine tools 111.

On the other hand, the receiver 102 receives, from a user terminal 130, product specifying data 120 for specifying a product to be manufactured.

The decider 103 decides, based on the product specifying data 120, a necessary machine tool 131 required to process the product.

Then, the presenter 104 searches for the necessary machine tool 131 from the usable machine tools 111, and presents, to the user terminal 130, information concerning a use machine tool 141 as a search result.

In the above-described arrangement, since the machine tool is selected from the plurality of machine tools in accordance with a condition, and presented and proposed to the user, the user can readily obtain information necessary to complete a desired product. In addition, it is possible to arouse a demand for a processed product using a machine tool, leading to effective use of an idle machine.

Second Example Embodiment

Figure 2:
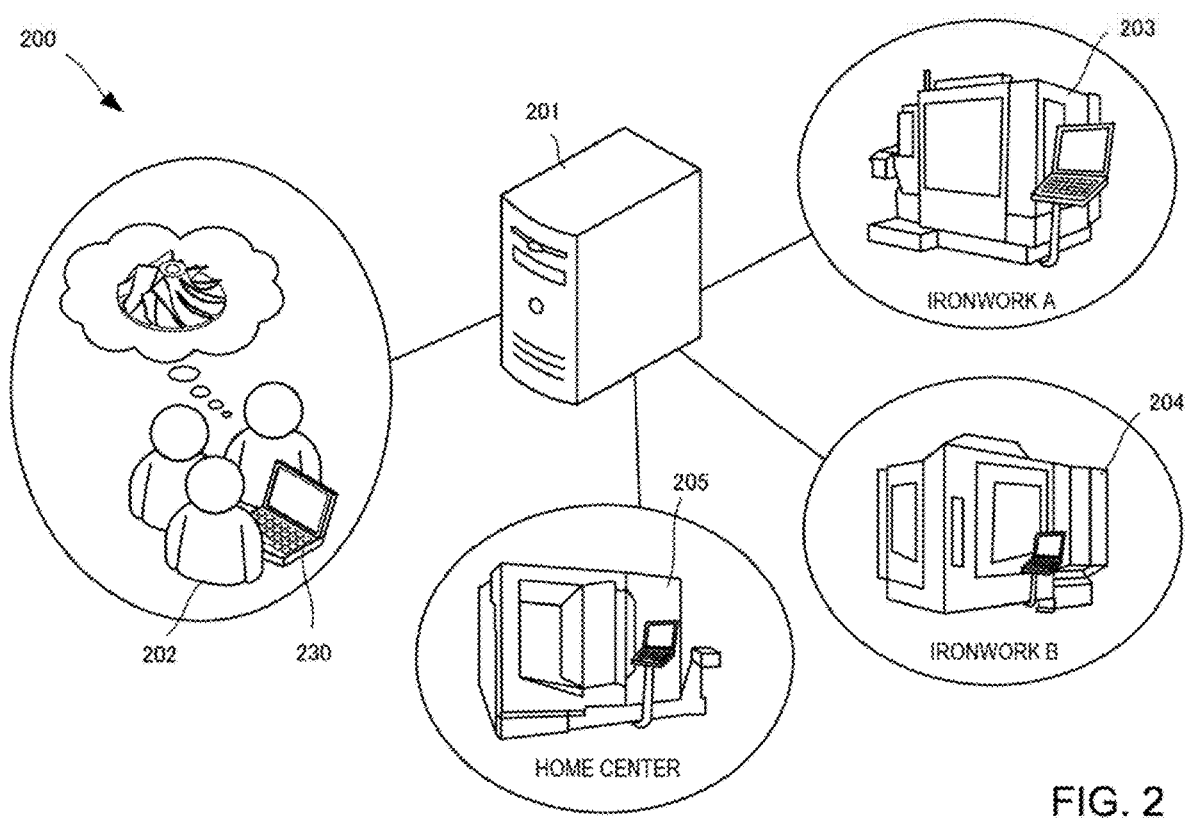
FIG. 2 is a diagram showing the arrangement of an information processing system according to the second example embodiment of the present invention.

An information processing system according to the second example embodiment of the present invention will be described next with reference to FIG. 2 and subsequent drawings. FIG. 2 is a view for explaining the overall arrangement of an information processing system 200 according to this example embodiment.

A user 202 generates processing data by forming 3D data of an image of a desired product, and notifies a server 201 of it using a user terminal 230. The server 201 analyzes the product data sent from the user terminal 230, and performs cutting simulation, thereby obtaining a necessary machine tool. On the other hand, the server 201 monitors various kinds of machine tools 203 to 205 used in various factories all the time, and stores their use states. Examples of the machine tools 203 to 205 are a vertical machining center, a horizontal machining center, an NC lathe, a 5-axis processing machine, an AM (Additive Manufacturing) hybrid machine, and a combined processing machine.

The server 201 can process a product based on the product data sent from the user terminal 230, and decide at least one machine tool that is not currently used, thereby presenting it to the user terminal 230.

Figure 3:
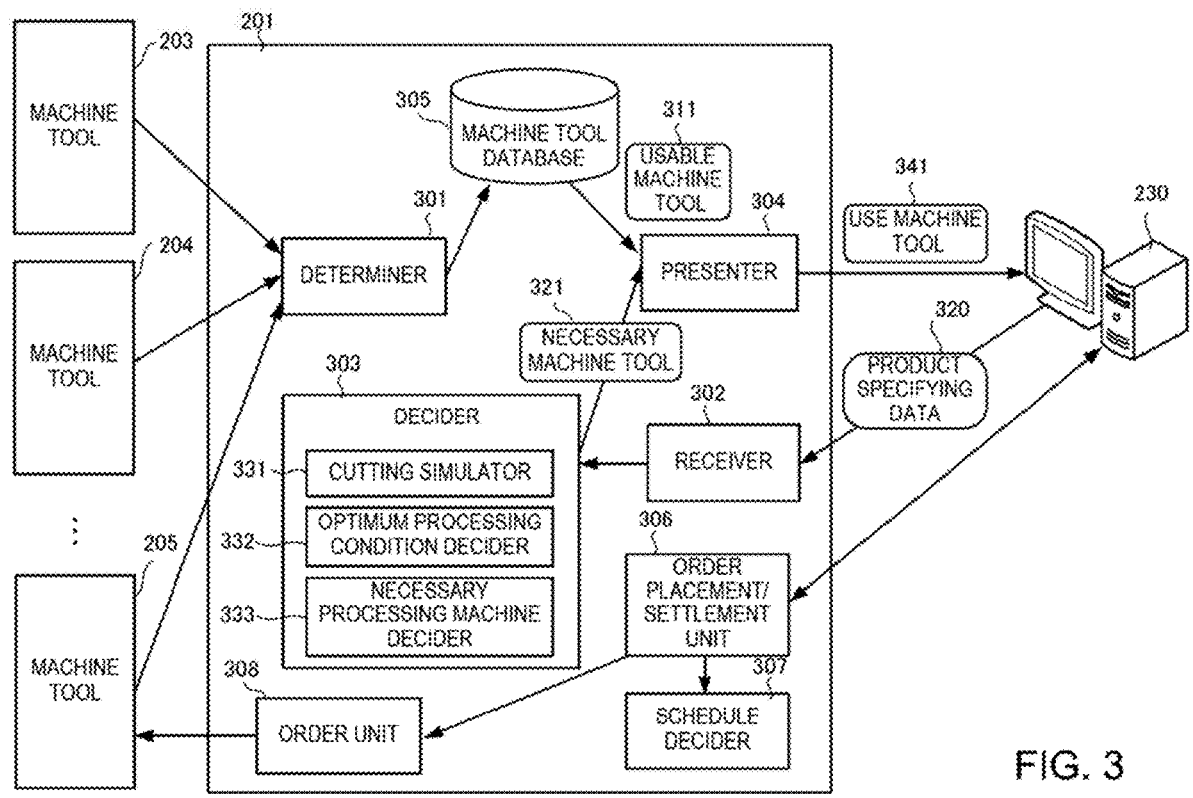
FIG. 3 is a block diagram showing the arrangement of an information processing apparatus according to the second example embodiment of the present invention.

FIG. 3 is a block diagram for explaining the internal arrangement of the server 201 according to this example embodiment. The server 201 includes a determiner 301, a receiver 302, a decider 303, a presenter 304, a machine tool database 305, an order placement/settlement unit 306, a schedule decider 307, and an order unit 308.

Figure 4:
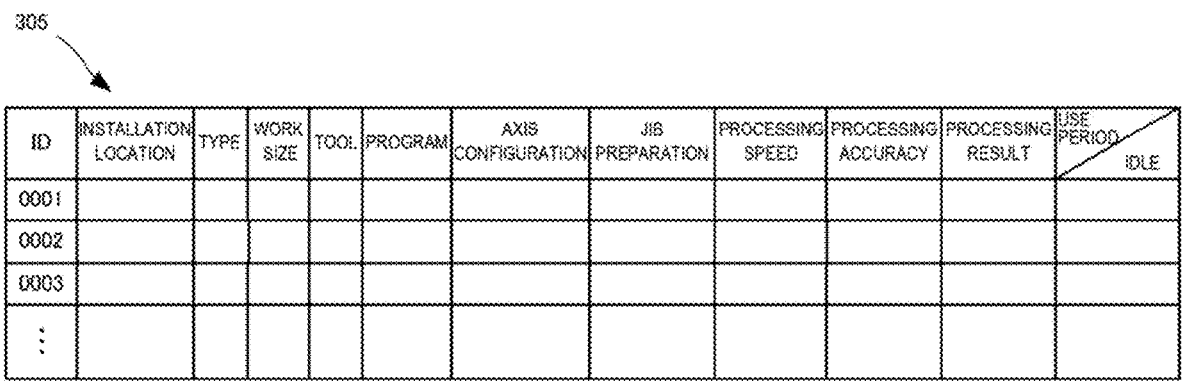
FIG. 4 is a table showing a machine tool database of the information processing apparatus according to the second example embodiment of the present invention.

The determiner 301 receives signals from sensors respectively provided in the plurality of machine tools 203 to 205, and determines the operation statuses of the machine tools 203 to 205, thereby deriving usable machine tools 311. The determiner 301 stores, in the machine tool database 305, various kinds of information of each machine tool managed by this system. More specifically, as shown in FIG. 4, a machine tool ID, an installation location, a type, a work size, a tool, a program such as a macro, an axis configuration, jig preparation, a processing speed, processing accuracy, and a processing result are stored in association with each other. The machine tool database 305 further stores a use status indicating an idle state or, when in use, the time until which the machine tool is used. This information is updated any time in accordance with the signal received by the determiner 301 from the sensor provided in the machine tool, the status directly input by the owner of the machine tool, or information from the order placement/settlement unit 306. With reference to the machine tool database 305, it is possible to grasp the location and state of a specific apparatus capable of performing specific processing for a specific work.

On the other hand, the receiver 302 receives, from the user terminal 230, product specifying data 320 for specifying a product to be manufactured. More specifically, the user terminal 230 is caused to display a screen shown in FIG. 5, thereby prompting the user to upload, for example, 3D CAD data or 2D CAD data as the product specifying data. Furthermore, the user is prompted to input the number of products, a desired delivery date, and a budget.

Based on the product specifying data 320, the decider 303 decides a necessary machine tool 321 required to process the product. More specifically, the decider 303 includes a cutting simulator 331 that performs cutting simulation in consideration of the product specifying data and the specifications and structural characteristics of each machine tool included in the machine tool database 305. The decider 303 includes an optimum processing condition decider 332 that decides an optimum processing condition based on a processing time, and processing accuracy as a result of the cutting simulation. The decider 303 also includes a necessary processing machine decider 333 that decides a necessary machine tool satisfying the decided optimum processing condition. The optimum processing condition decider 332 may decide the optimum processing condition based on the chatter suppression degree, the chatter stability limit, and the processing distance of each machine tool.

For example, based on the result of the cutting simulation performed in consideration of the structural characteristics of each machine tool, a machine for which at least one of the chatter suppression degree, the processing accuracy, the processing time, and the processing distance indicates a good result (exceeds a given threshold or has a high value among the plurality of machines) may be decided as the necessary machine tool 321.

The decider 303 may specify, with reference to an enormous amount of past processing result data included in the machine tool database 305, a past product having a shape most similar to the product specifying data sent from the user, and then decide, as a necessary machine tool, a machine tool that processed the past product. More specifically, a plurality of singular points are extracted from the product specifying data sent from the user, and compared with the singular points of the past product shape. If the relative positional relationships of the plurality of singular points are similar with a predetermined likelihood, the past product shape is determined as a similar shape.

The presenter 304 searches for the necessary machine tool 321 from the plurality of usable machine tools 311, and presents, to the user terminal 230, information concerning a use machine tool 341 as a search result. Even if a machine tool is set to "in use" in the machine tool database 305, if the machine tool can be idle for a predetermined period before the delivery date desired by the user, it is set as the usable machine tool 311.

Figure 6:
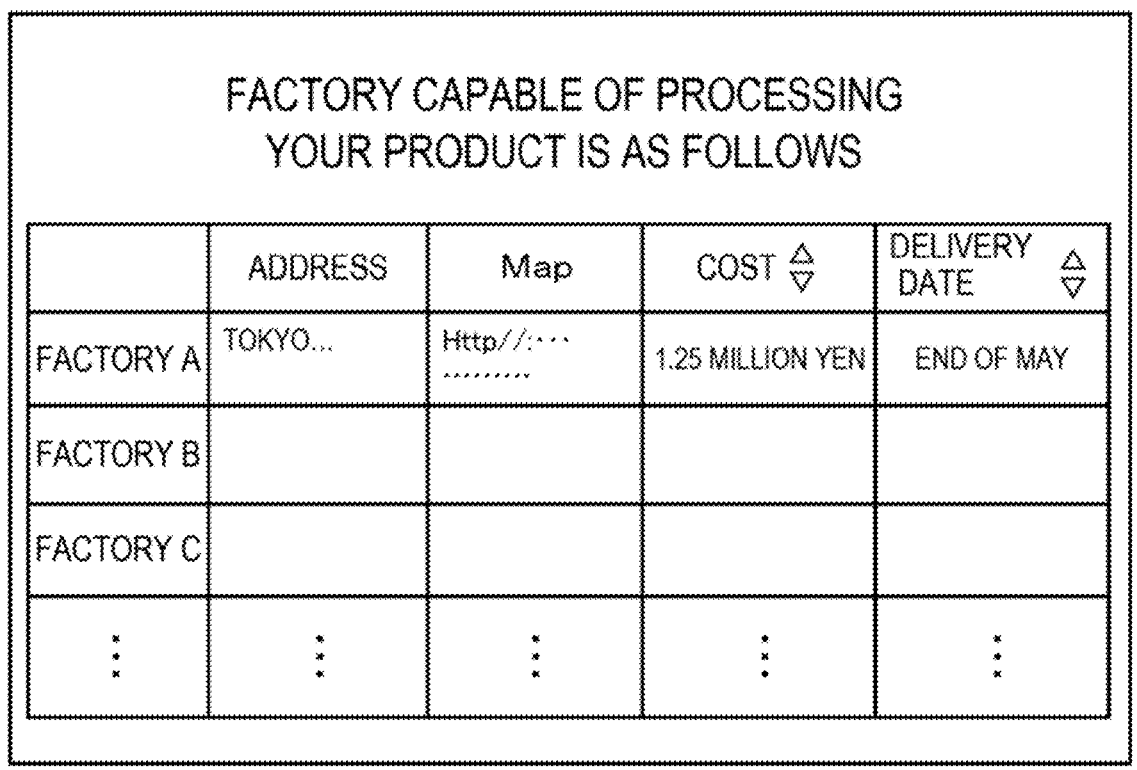
FIG. 6 is a view showing an example of a screen provided by the information processing apparatus according to the second example embodiment of the present invention.

FIG. 6 shows an example of a screen 600 presented by the presenter 304. As shown in FIG. 6, the presenter 304 provides at least one of information of a factory including the use machine tool, the cost, and the delivery date. The screen presented by the presenter 304 is not limited to that shown in FIG. 6, and processing accuracy, a processing time, a processing distance, and the like may be presented. Furthermore, the presenter 304 may display a list of factories each including the use machine tool in an order of at least one of a delivery date order, cost order, processing accuracy order, processing time order, and processing distance order.

The presenter 304 may present, as the necessary machine tool, a set of a plurality of machine tools necessary to process the product. In this case, the presenter 304 may present one factory or a combination of a plurality of factories including the set of the plurality of machine tools. The presenter 304 may further present a past processing case in the factory.

The schedule decider 307 decides a schedule using the use machine tool.

The determiner 301 may determine whether processing progresses in accordance with the schedule decided by the schedule decider 307.

The order unit 308 places an order to the selected factory based on order contents received by the order placement/settlement unit 306.

Figure 7:
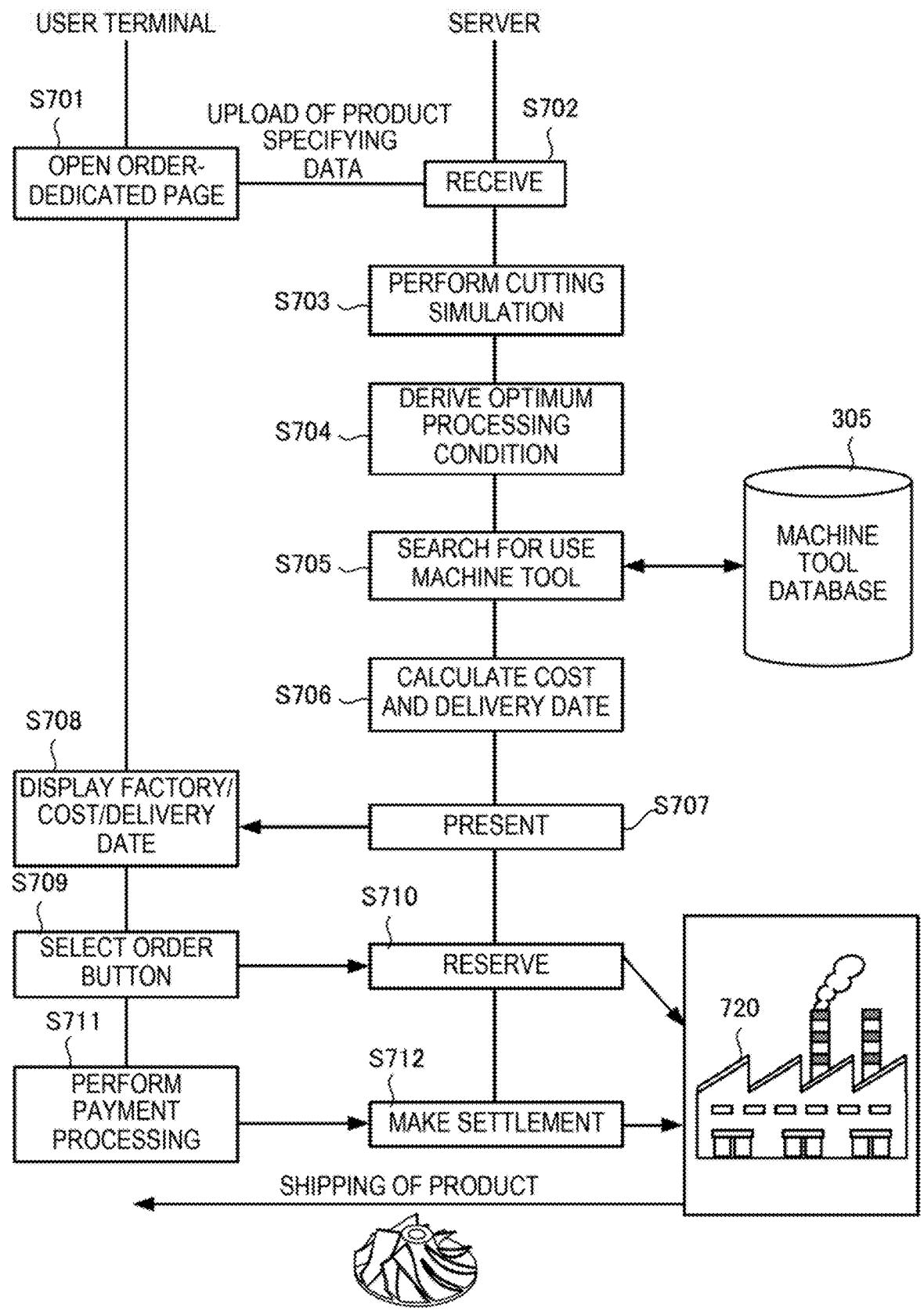
FIG. 7 is a sequence chart showing the procedure of the processing of the information processing apparatus according to the second example embodiment of the present invention.

FIG. 7 is a sequence chart for explaining the procedure of processing using this system. When the user considers "wanting such part", he/she opens an order-dedicated page prepared in advance in the system in the Internet (S701). Then, "product specifying data" is uploaded. Alternatively, product specifying data created by CAD prepared on the Internet may be uploaded.

Then, the receiver 302 receives the data (S702), and the decider 303 instantaneously performs cutting simulation (S703), determines whether it is possible to perform processing of a desired shape with desired accuracy, and derives an "optimum processing condition" from a use tool, a holder, a chatter suppression degree, a chatter stability limit, a processing time, a processing distance, processing accuracy, and the like (S704). At this time, the chatter suppression degree, the chatter stability limit, and the processing distance are associated with a tool life, and thus a processing condition that prolongs the tool life may be selected.

A machine tool that can perform processing under the "optimum processing condition" is searched for from the machine tools in the "idle" state with reference to the machine tool database 305.

In step S706, the cost and delivery date when the machine tool is used are calculated. Finally, information indicating "when (delivery date)", "who (manufacturer's name)", and "how much (cost)" of processing is presented to the user terminal (S707 and S708).

Then, if the user who has looked at the presented information selects one of the machine tools and presses an "order" button (S709), the selected machine tool is reserved, and a factory 720 including the machine tool receives work (S710). Subsequently, a settlement is made in advance or upon completion (S711 and S712), and the factory 720 ships the processed finished product to the user.

Figure 8:
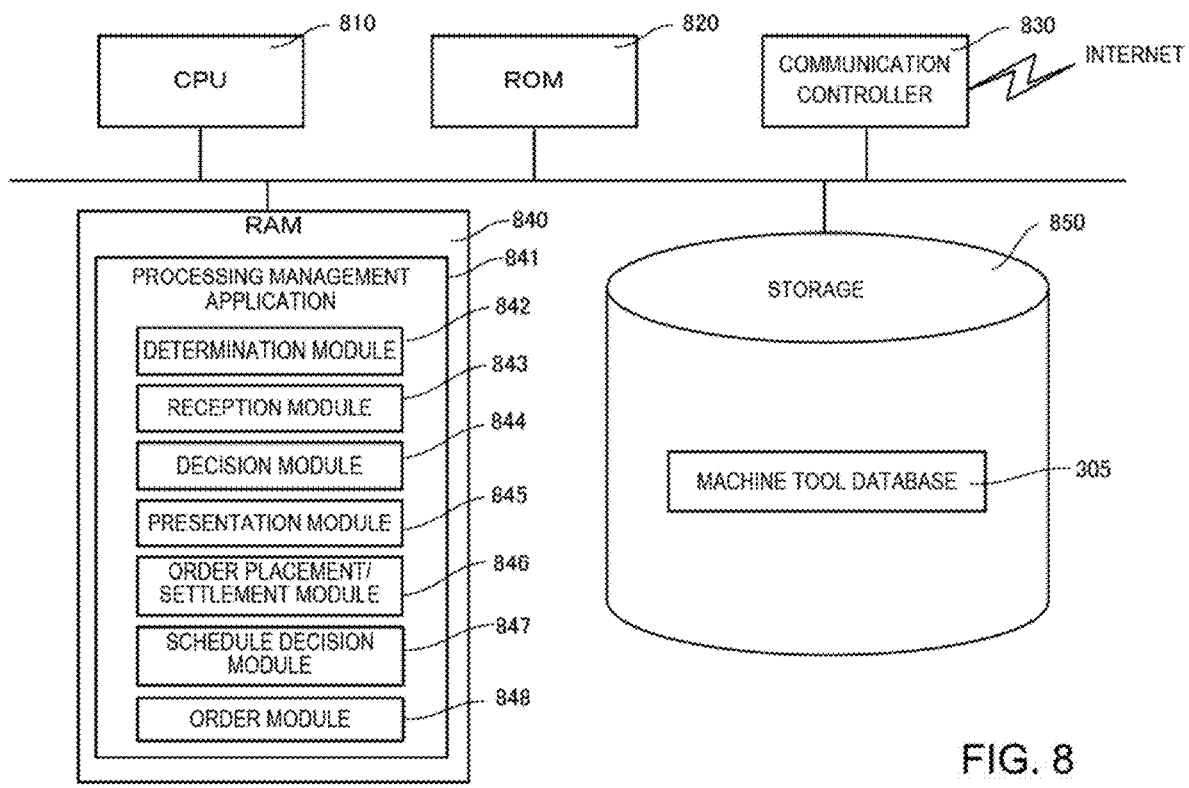
FIG. 8 is a view showing the hardware arrangement of the information processing apparatus according to the second example embodiment of the present invention.

The hardware arrangement of the server 201 will be described with reference to FIG. 8. The server 201 includes a CPU 810, a ROM 820, a communication controller 830, a RAM 840, and a storage 850. The CPU 810 is a central processing unit, and controls the overall server 201 by executing various programs. The ROM 820 is a read only memory, and stores a boot program to be executed first by the CPU 810, various parameters, and the like. The communication controller 830 controls communication with another terminal via a network. The RAM 840 is a random access memory, and includes an execution area of processing management application 841. The processing management application 841 includes a determination module 842, a reception module 843, a decision module 844, a presentation module 845, an order placement/settlement module 846, a schedule decision module 847, and an order module 848. The modules have functions corresponding to the functional components shown in FIG. 3, respectively, and a detailed description thereof will be omitted. On the other hand, the storage 850 stores the machine tool database 305.

According to this example embodiment, the user receives a product by only sending data. In addition, a factory can obtain a merit that "it gets work only by waiting".

That is, a user who considers wanting to manufacture and sell such a product can get a chance to do fabless business very easily. On the other hand, a machine tool user can get regular orders using this system, thereby obtaining a merit that idle machines can be reduced.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. An information processing apparatus, comprising:
a presenter, configured to present to a user terminal an order-dedicated screen to upload a manufacturing order comprising product specifying data, a desired delivery date, and a budget, wherein the product specifying data specifies a product to be manufactured;
a receiver, configured to receive from the user terminal the manufacturing order comprising the product specifying data, the desired delivery date, and the budget;

a signal detector, configured to detect signals from sensors respectively provided in a plurality of machine tools;
a processor, configured to:
  process the signals from the sensors to determine operation statuses of the plurality of machine tools;
  determine, with reference to a machine tool database, machine tools which can be idle for a predetermined period before the desired delivery date as a plurality of usable machine tools, wherein the machine tool database stores, for each machine tool, a machine tool ID, specifications and structural characteristics, an installation location, a type, a processing result, and a use status indicating an idle state or, when in use, the time until which the machine tool is used;
  perform cutting simulation in consideration of the product specifying data and the specifications and structural characteristics of each machine tool included in the machine tool database;
  determine whether it is possible to perform processing of a desired shape with a desired accuracy;
  derive an optimum processing condition from a processing time and processing accuracy;
  determine a necessary machine tool which can perform processing under the optimum processing condition, by analyzing past processing result data included in the machine tool database and a past product having a shape most similar to the product specifying data received from the user terminal;
  determine, as the necessary machine tool, a machine tool that processed the past product, wherein a plurality of singular points are extracted from the product specifying data and compared with singular points of the past product shape, to determine shape similarity; and
  search for the necessary machine tool from among the plurality of usable machine tools; and
a display unit, configured to display information concerning the necessary machine tool as a search result, wherein said search result includes a list of factories each including the necessary machine tool in an order of at least one of a delivery date order, cost order, processing accuracy order, processing time order, and processing distance order;
wherein the display unit is further configured to prompt the user terminal to place an order to reserve a selected machine tool.

2. The information processing apparatus according to claim 1, wherein said processor determines the optimum processing condition further based on a chatter suppression degree, a chatter stability limit, and a processing distance.

3. The information processing apparatus according to claim 1, wherein said processor determines the plurality of usable machine tools based on statuses set by owners of the plurality of machine tools.

4. The information processing apparatus according to claim 1, wherein the processor is further configured to determine a schedule of using the necessary machine tool.

5. The information processing apparatus according to claim 4, wherein said processor further determines whether production progresses in accordance with the schedule.

6. The information processing apparatus according to claim 1, wherein said display unit further displays a list of necessary machine tools in an order of at least one of a delivery date order, cost order, processing accuracy order, processing time order, and processing distance order.

7. The information processing apparatus according to claim 1, wherein said display unit further displays a set of a plurality of machine tools as the necessary machine tool.

8. The information processing apparatus according to claim 1, wherein said display unit further displays a past processing case of the necessary machine tool.

9. The information processing apparatus according to claim 1. wherein said display unit further displays the necessary machine tool based on an idle period of each usable machine tool.

10. The information processing apparatus of claim 1, wherein the product specifying data further includes 2D or 3D CAD data.

11. An information processing method, comprising:
  presenting to a user terminal an order-dedicated screen to upload a manufacturing order comprising product specifying data. a desired delivery date, and a budget, wherein the product specifying data specifies a product to be manufactured;
  receiving from the user terminal the manufacturing order comprising the product specifying data, the desired delivery date, and the budget;
  detecting signals from sensors respectively provided in a plurality of machine tools;
  processing the signals from the sensors to determine operation statuses of the plurality of machine tools;
  determining, with reference to a machine tool database, machine tools which can be idle for a predetermined period before the desired delivery date as a plurality of usable machine tools, wherein the machine tool database stores, for each machine tool, a machine tool ID, specifications and structural characteristics, an installation location, a type, a processing result, and a use status indicating an idle state or, when in use, the time until which the machine tool is used;
  performing cutting simulation in consideration of the product specifying data and the specifications and structural characteristics of each machine tool included in the machine tool database;
  determining whether it is possible to perform processing of a desired shape with a desired accuracy;
  deriving an optimum processing condition from a processing time and processing accuracy;
  determining a necessary machine tool which can perform processing under the optimum processing condition, by analyzing past processing result data included in the machine tool database and a past product having a shape most similar to the product specifying data received from the user terminal;
  determining, as the necessary machine tool, a machine tool that processed the past product, wherein a plurality of singular points are extracted from the product specifying data and compared with singular points of the past product shape, to determine shape similarity;
  searching for the necessary machine tool from the plurality of usable machine tools;
  presenting information concerning the necessary machine tool as a search result, wherein said search result includes a list of factories each including the necessary machine tool in an order of at least one of a delivery date order, cost order, processing accuracy order, processing time order, and processing distance order; and
  prompting the user terminal to place an order to reserve a selected machine tool.

12. The information processing method according to claim 11, wherein the product specifying data further includes 2D or 3D CAD data.

13. The information processing method according to claim 11, wherein said deriving step includes determining the optimum processing condition further based on a chatter suppression degree, a chatter stability limit, and a processing distance.

14. The information processing method according to claim 11, wherein said step of determining the plurality of usable machine tools is further based on statuses set by owners of the plurality of machine tools.

15. A non-transitory computer readable medium storing an information processing program for causing a computer to execute a method, said method comprising:

presenting to a user terminal an order-dedicated screen to upload a manufacturing order comprising product specifying data, a desired delivery date, and a budget, wherein the product specifying data specifies a product to be manufactured;

receiving the manufacturing order comprising the product specifying data, the desired delivery date, and the budget;

detecting signals from sensors respectively provided in a plurality of machine tools; processing the signals from the sensors to determine operation statuses of the plurality of machine tools;

determining, with reference to a machine tool database, machine tools which can be idle for a predetermined period before the desired delivery date as a plurality of usable machine tools, wherein the machine tool database stores, for each machine tool, a machine tool ID, specifications and structural characteristics, an installation location, a type, a processing result, and a use status indicating an idle state or, when in use, the time until which the machine tool is used;

performing cutting simulation in consideration of the product specifying data and the specifications and structural characteristics of each machine tool included in the machine tool database;

determining whether it is possible to perform processing of a desired shape with a desired accuracy;

deriving an optimum processing condition from a processing time and processing accuracy; and determining a necessary machine tool which can perform processing under the optimum processing condition, by analyzing past processing result data included in the machine tool database and a past product having a shape most similar to the product specifying data received from the user terminal;

determining, as the necessary machine tool, a machine tool that processed the past product, wherein a plurality of singular points are extracted from the product specifying data and compared with singular points of the past product shape, to determine shape similarity;

searching for the necessary machine tool from the plurality of usable machine tools;

presenting information concerning the necessary machine tool as a search result, wherein said search result includes a list of factories each including the necessary machine tool in an order of at least one of a delivery date order, cost order, processing accuracy order, processing time order, and processing distance order; and prompting the user terminal to place an order to reserve a selected machine tool.

16. The information processing method according to claim 11, further comprising displaying a set of a plurality of machine tools as the necessary machine tool.

17. The non-transitory computer-readable medium according to claim 15, wherein the product specifying data further includes 2D or 3D CAD data.

18. The non-transitory computer-readable medium according to claim 15, wherein said deriving step includes determining the optimum processing condition further based on a chatter suppression degree, a chatter stability limit, and a processing distance.

19. The non-transitory computer-readable medium according to claim 15, wherein said step of determining the plurality of usable machine tools is further based on statuses set by owners of the plurality of machine tools.

20. The non-transitory computer-readable medium according to claim 15, further comprising displaying a set of a plurality of machine tools as the necessary machine tool.

* * * * *